United States Patent

Dianov et al.

Patent Number: 6,125,225
Date of Patent: Sep. 26, 2000

[54] MODE FIELD DIAMETER CONVERSION FIBER, METHOD FOR LOCALLY CHANGING A REFRACTIVE INDEX OF OPTICAL WAVEGUIDES AND METHOD FOR FABRICATING OPTICAL WAVEGUIDE PREFORMS

[75] Inventors: Evgeny Mikhailovich Dianov; Konstantin Mikhailovich Golant; Vladimir Ivanovich Karpov; Vladimir Nikolaevich Protopopov; Mikhail Vladimirovich Grekov; Rostislav Radievich Khrapko, all of Moscow, Russian Federation

[73] Assignee: Nauchny Tsenir Volokonnoi Optiki Pri Institute Obschei Fiziki Rossiiskoi Akademii Nauk, Moscow, Russian Federation

[21] Appl. No.: 09/101,425
[22] PCT Filed: Sep. 3, 1997
[86] PCT No.: PCT/RU97/00278
    § 371 Date: Jul. 9, 1998
    § 102(e) Date: Jul. 9, 1998
[87] PCT Pub. No.: WO98/28643
    PCT Pub. Date: Jul. 2, 1998

[30] Foreign Application Priority Data

Dec. 20, 1996 [RU] Russian Federation ............. 96124037
Mar. 14, 1997 [RU] Russian Federation ............. 97103937
Jun. 5, 1997 [RU] Russian Federation ............. 97109601

[51] Int. Cl.[7] .................................................. G02B 6/18
[52] U.S. Cl. ............................ 385/124; 385/142; 65/385
[58] Field of Search .................................. 385/123, 124, 385/141, 142; 65/385, 390, 397, 398

[56] References Cited

U.S. PATENT DOCUMENTS 3,999,835  12/1976  Newns et al. ............................ 385/123
4,203,744   5/1980  Schultz et al. ............................ 65/3 A
4,402,720   9/1983  Edahiro et al. ......................... 65/3.12

(List continued on next page.)

FOREIGN PATENT DOCUMENTS 7-196326   8/1995  Japan ............................... G02B 6/00
2010775    6/1991  Russian Federation ...... C03B 37/018
2259996    3/1993  United Kingdom ............. G02B 6/14

OTHER PUBLICATIONS

Abstract of RU 2010775 of Jun. 1991.
Hill, K.O. et al. "Photosensitivity in optical fiber waveguides: Application to reflection filter fabrication" *Applied Physics Letters*, 32(10) (May 15, 1978), pp. 647–649.

(List continued on next page.)

*Primary Examiner*—John D. Lee
*Attorney, Agent, or Firm*—Ladas & Parry

[57] ABSTRACT

The invention relates to fiber optics and can be employed in fiber radiation collimators, optical waveguide couplers, spectral filters, optical isolators, long-period gratings, dispersion compensators, cascade mode field diameter conversion fibers on simulated Raman effect, physical value sensors, radiation suppression units for predetermined wavelengths, and for smoothing the gain spectrum in erbium fiber amplifiers. The invention facilitates fabrication of optical waveguides and apparatuses based on them. To produce preforms for optical waveguides (1) by a plasma chemical vapor deposition method, molecular gaseous agents, fed to a substrate tube (24), are mixed so that less than five atoms of oxygen fall on every atom of silicon and more than one atom of nitrogen falls on every 1000 atoms of oxygen. The refractive index is locally changed by heating a length of an optical waveguide (1). This causes a local thermal diffusion of elements contained in a core (3) into a cladding (2), or vice versa. The length of the optical waveguide (1) is heated by current of an electric arc (10) or by radiation (16) of an infrared laser (15). The core (3) is doped with nitrogen at concentration from 0.01 at. % to 5 at. %. In the mode field diameter conversion fiber, a diameter of the core (3) changes along the length of the optical waveguide (1), increasing towards its end (4).

9 Claims, 7 Drawing Sheets

U.S. PATENT DOCUMENTS

| | | | |
|---|---|---|---|
| 4,737,006 | 4/1988 | Warbrick | 350/96.18 |
| 4,838,634 | 6/1989 | Bennion et al. | 350/96.12 |
| 5,301,252 | 4/1994 | Yanagawa et al. | 385/96 |
| 5,381,503 | 1/1995 | Kanamori et al. | 385/123 |
| 5,732,170 | 3/1998 | Okude et al. | 385/27 |

OTHER PUBLICATIONS

Meltz, G. et al. "Formation of Bragg gratings in optical fibers by a transverse holographic method" *Optics Letters*, vol. 14, No. 15 (Aug. 1, 1989).

Hill, K.O. et al. "Efficient Mode Conversion in Telecommunication Fibre Using Externally Written Gratings" *Electronics Letters*, vol. 26, No. 16, (Aug. 2, 1990).

Dianov, E. M. et al. "Low–Hydrogen Silicon Oxynitride Optical Fibers Prepared by SPCVD" *Journal of Lightwave Technology*, vol. 13, No. 7 (Jul., 1995).

Shiraishi, Kazuo et al. "Beam Expanding Fiber Using Thermal Diffusion of the Dopant" *Journal of Lightwave Technology*, vol. 8, No. 8 (Aug., 1990).

"Technology of Fibre–Optic Light Conduits" (in English and in Russian). (No Date).

MODE FIELD DIAMETER CONVERSION FIBER, METHOD FOR LOCALLY CHANGING A REFRACTIVE INDEX OF OPTICAL WAVEGUIDES AND METHOD FOR FABRICATING OPTICAL WAVEGUIDE PREFORMS

1. FIELD OF THE INVENTION

The present invention relates to fiber optics.

2. BACKGROUND OF THE INVENTION

A conventional mode field diameter conversion fiber comprising a length of an optical waveguide including a quartz glass cladding and a germanium-doped quartz glass core, wherein the core diameter varies along the optical waveguide, increasing towards its end, is disclosed, e.g., by K. Shiraishi, Y. Aizava, S. Kawakami in the reference titled as "Beam Expanding Fiber Using Thermal Diffusion of Dopant" in IEEE Journal of Lightwave Technology, 1990, vol.8, No.8, p.1151–1161. In the mode field diameter conversion fiber of the above reference, the longitudinal variation in a core diameter is provided owing to redistribution of the radial doping profile, which forms the refractive index structure of the optical waveguide, in the process of thermal diffusion of germanium.

The problem with the mode field diameter conversion fiber is a complicated technology caused by a small coefficient of germanium diffusion to quartz glass, resulting in a prolonged heat treatment of the optical waveguide, required to produce a mode field diameter conversion fiber. Apart from that, the diffusion occurs efficiently only at the temperature of 1600° C. to 1800° C. that is close to the melting point and, therefore, causes deformations in optical waveguides.

Closely approaching the claimed invention is a mode field diameter conversion fiber comprising a length of an optical waveguide including a quartz glass cladding and a doped quartz glass core, wherein the core diameter varies along the optical waveguide, increasing towards its end (see, e.g., U.S. Pat. No. 5,381,503, Int.Cl. G 02 B 6/10). In the prior art fiber, the core is initially doped with germanium and fluorine. Unlike germanium, fluorine reduces the quartz glass refractive index and additionally exhibits a greater thermal diffusion coefficient at the temperature of 1600° C. to 1800° C. As the result, when the optical waveguide with the double-doped core is heated, fluorine faster penetrates into the cladding, providing an efficient increase in the glass core refractive index and, therefore, a decreased mode field diameter.

A disadvantage of the above prior art is a complicated fabrication of the mode field diameter conversion fiber and a narrow range of mode field diameter variation, which is caused by a limited concentration of fluorine that can be introduced into the core along with germanium. Furthermore, the fluorine diffusion will unavoidably lead to the appearance, in such an optical waveguide, of regions with a decreased refractive index, which hampers coupling to conventional optical waveguides.

Described by O. Hill, Y. Fujii, D. C. Johnson and B. S. Kawasaki in the reference titled as "Photosensitivity in Optical Fiber Waveguides: Application to Reflection Filter Fabrication". Appl. Phys. Lett. 1978, Vol.32, No.10, p.647–649, is a method for locally changing the refractive index of an optical waveguide, involving subjecting the optical waveguide to external exposure. Change in the refractive index occurs due to the photorefractive effect and is caused by the presence of defects that give rise to the appearance of specific bands in the absorption spectrum of the optical waveguide core. In this case, a two-photon interaction takes place. In the optical waveguide, an incoming beam and a beam reflected from the end face interfere, causing a periodic change in the refractive index.

Disadvantages of the above prior art method include a sophisticated process, a small change ($\Delta \sim 10^{-6}$) in the refractive index, impossibility to vary a period of the grating produced, high cost and complexity of operating the apparatus implementing the method.

Another method for locally changing the refractive index of an optical waveguide, involving subjecting the optical waveguide to external exposure, was disclosed by G. Meltz, W. W. Morey, W. H. Glen in the reference titled as "Formation of Bragg Gratings in Optical Fibers by a Transverse Holographic Method". Opt. Lett., 1989, vol.14, No.15, p.823–825. In accordance with the method, an optical waveguide is exposed to a laser radiation at a wavelength close to 240 nm. A grating is formed in the optical waveguide using an interference effect, by directing two beams at an angle $\theta$ to the optical waveguide surface. A period of the grating formed can be altered by varying the angle $\theta$.

The above prior art method, however, suffers from an elaborated technology of locally changing the refractive index of an optical waveguide.

K. O. Hill, F. Bilodean, B. Malo, D. C. Malo, D. C. Johnson, I. S. Kinner, "Efficient Mode Conversion in Telecommunication Fiber Using Externally Writing Gratings". Electron. Lett., 1990, vol.26, p.1270–1272, disclose a method for locally changing the refractive index of an optical waveguide, involving subjecting the optical waveguide to external exposure. In this method, a photosensitive optical waveguide is exposed, at the side surface, to ultraviolet laser radiation that has passed through a narrow slit. Within the exposure region, a photo-induced local increase in the refractive index occurs, which corresponds to writing a single groove of the grating. The exposure is then interrupted and the optical waveguide is axially displaced relative to the laser beam at a distance equal to the grating period, following which a next grating groove is written. By periodically repeating the optical waveguide exposure and axial displacement procedures, a periodical sequence of core regions having different refraction indices is formed, representing a grating.

However, the process of locally changing the refractive index is rather complicated owing to use of the ultraviolet laser radiation and by virtue of the fact that a number of photosensitive types of optical waveguides is limited. In addition, the employed ultraviolet lasers are relatively expensive, sophisticated in service, have insufficient reliability and their radiation is hazardous to human eye.

Closely approaching the present invention is a method for locally changing the refractive index of an optical waveguide, involving heating a length of an optical waveguide including a cladding and a core, each one being based on quartz glass and at least one of them being doped, providing a local thermal diffusion of the elements contained in the core to the cladding, and/or providing a local thermal diffusion of the elements contained in the cladding to the core. See, e.g. U.S. Pat. No. 5,381,503, Int.Cl. G 02 B 6/10. In this method, a length of an optical waveguide is heated in a resistance-heated furnace.

The double doping with germanium and fluorine significantly complicates the fabrication of optical waveguides for a mode field diameter conversion fiber. A further disadvantage of this method is that it is impossible to control the law of changing the core refractive index along the optical fiber axis, which is defined by the temperature distribution within the heating apparatus and cannot be modified in the course of the process. A further problem is that the optical waveguide undergoes deformation when heated, owing to relaxation of lateral stresses appearing when the optical waveguide is fixed.

A method for fabricating a preform for a quartz glass-based optical waveguide, including feeding a mixture of molecular gaseous agents containing atoms of oxygen and silicon into a substrate tube, and depositing the products of the reaction occurring in the mixture on the inner surface of the substrate tube, is described, e.g., in the Reference Book of Fiber Optic Communication Links, L. M. Andrushko, V. A. Voznesenskii, V. B. Katok et al.; under edition of S. V. Svechnikov and L. M. Andrushko, Kiev, Tekhnika, 1988, p.69.

However, fabrication of a preform from nitrogen-doped quartz glass is unfeasible under thermodynamic equilibrium conditions typical for this method.

A method for fabricating preforms for optical waveguides based on nitrogen-doped quartz glass, that is most closely approaching the claimed invention, includes feeding a mixture of molecular gaseous agents containing atoms of nitrogen, oxygen and silicon into a substrate tube, exciting a microwave discharge in the mixture and depositing products of the reaction occurring in the mixture on the inner surface of the substrate tube. See, e.g., E. M. Dianov, K. M. Golant, R. R. Kharpko, A. S. Kurkov, A. L. Tomashuk. "Low-Hydrogen Silicon Oxynitride Optical Fibers Prepared by SPCVD". IEEE Journal of Lightwave Technology, 1995, vol.13, No.7, p.1471–1474. The basis for this method is fabrication of an optical waveguide preform by plasma-enhanced synthesis of nitrogen-doped quartz glass layers on the inner wall of a quartz glass substrate tube by the SPCVD process.

The method, however, is technologically complicated since it does not employ process parameters in the preform synthesis, which would allow a reproducible control of the nitrogen concentration in the quartz glass, required to obtain a desired refractive index difference Δn between the optical waveguide core and cladding.

3. SUMMARY OF THE INVENTION

It is an object of the present invention to facilitate fabrication of optical waveguides and apparatuses on their basis.

The aforementioned object is attained by a conventional mode field diameter conversion fiber comprising a length of an optical waveguide including a quartz glass cladding and a doped quartz glass core, the core diameter varying along the optical waveguide, increasing towards its end, wherein in accordance with the present invention the core of the optical waveguide is doped with a dopant, such as nitrogen, the dopant concentration being from 0.01 at. % to 5 at. %.

The object of the invention is also attained by a conventional method of fabricating a mode field diameter conversion fiber, including heating a length of an optical waveguide comprising a cladding and a core, each one being based on quartz glass and at least one of them being doped, wherein in accordance with the invention local thermal diffusion is provided by heating the length of the optical waveguide having the core doped with nitrogen at the concentration from 0.01 at. % to 5 at. %, said heating being performed by current of an electric arc or radiation of an infrared laser.

In particular, the heating of the length of the optical waveguide is periodically interrupted, and during the periodic interruption the heating region is relatively displaced along the optical waveguide axis at a distance divisible by the spatial interval of the refractive index variation.

In particular, a local thermal diffusion of such dopants as phosphorous, aluminum, sodium, potassium, lithium, cesium, germanium, fluorine, boron and/or at least one of the rare-earth elements, is provided.

The length of the optical waveguide can be heated by an electric arc current from 5 mA to 500 mA for a time from 0.1 s to 600 min, the electric arc being located within a region as large as 1 mm to 15 mm along the optical waveguide axis and generated by electrodes with sharpened ends, and said heating is followed by cutting off the length of the optical waveguide at right angle to its axis in a region corresponding to the predetermined mode size.

The electric arc can be displaced along the optical waveguide axis at a variable speed, and/or the current of the electric arc can be varied.

In particular, to avoid deformations caused by mechanical stresses when an optical waveguide is fixed in two points, an auxiliary optical waveguide is spliced with the optical waveguide before the thermal diffusion.

The heating can be provided by radiation of CO-laser, $CO_2$-laser, erbium laser or holmium laser.

In particular, a length of an optical waveguide with a silicon oxynitride ($Si_3N_4$:$SiO_2$)-based core can be heated.

A length of an optical waveguide with a fluorine and/or boron-doped cladding can be heated.

The object of the invention is also attained by a conventional method for fabricating preforms for optical waveguides based on nitrogen-doped quartz glass, including feeding a mixture of molecular gaseous agents containing atoms of nitrogen, oxygen and silicon into a substrate tube, exciting a microwave discharge in the mixture, and depositing products of the reaction occurring in the mixture on the inner surface of the substrate tube, wherein in accordance with the invention the molecular gaseous agents, that are fed into the substrate tube, are mixed so that less than five atoms of oxygen fall on every silicon atom, and more than one atom of nitrogen fall on every 1000 atoms of oxygen.

In particular, the mixture of molecular gaseous agents is at least one of the following mixtures: $SiCl_4+O_2+N_2$, $SiCl_4+O_2+NO_2$, $SiCl_4+O_2+N_2O_3$, $SiCl_4+O_2+N_2O_4$, $SiCl_4+O_2+N_2O$, $SiCl_4+O_2+NO$ and/or $SiCl_4+O_2+NH_3$.

In particular, the temperature of the substrate tube is from 900° C. to 1300° C.

In particular, the power required to excite the microwave discharge in the substrate tube is from 0.1 kW to 10 kW.

In particular, the gaseous agents within the substrate tube are under the pressure from 0.05 mm Hg to 50 mm Hg.

An optical waveguide mode field diameter conversion fiber, a method for locally changing the refractive index of an optical waveguide and a method for fabricating preforms for optical waveguides, that are employed to produce the mode field diameter conversion fiber in accordance with the invention, are united by a single inventive concept and jointly provide the attainment of the aforementioned technical result.

4. BRIEF DESCRIPTION OF THE DRAWINGS

The present invention will be apparent from the following description of its embodiments, taken in conjunction with the accompanying drawings in which.

5. DETAILED DESCRIPTION OF THE EMBODIMENTS

Figure 1:
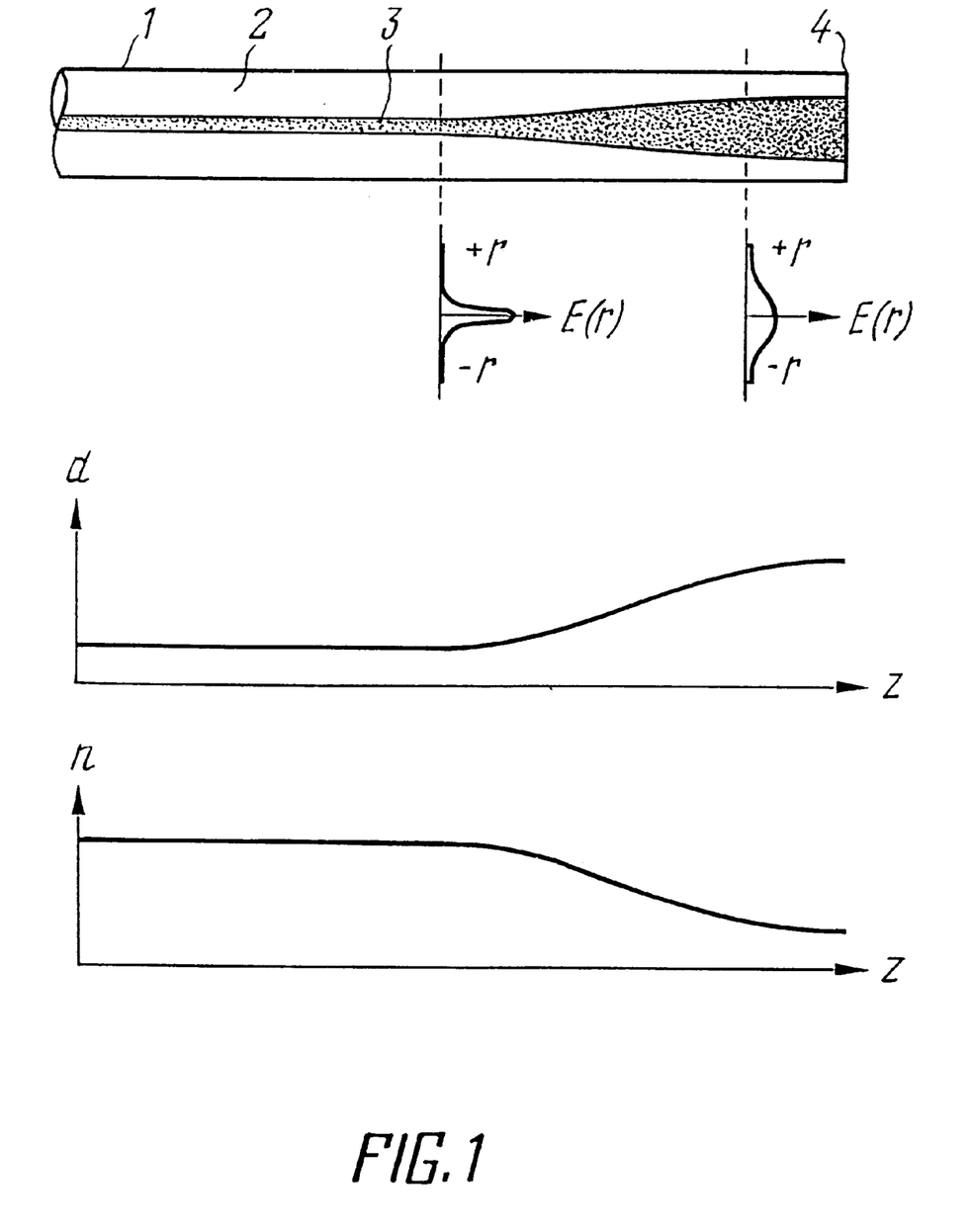
FIG. 1 illustrates the structure of a mode field diameter conversion fiber; a distribution of electric field E(r) across the core diameter; core diameter d and refractive index n as a function of distance z along the optical waveguide axis.

Referring to FIG. 1, a mode field diameter conversion fiber comprises a length of an optical waveguide 1 including a cladding 2 and a core 3, wherein a diameter d of the core 3 is increasing towards the end 4 of the length of the optical waveguide, while the effective refractive index n thereof is decreasing.

In an apparatus for fabricating a mode field diameter conversion fiber, using an electric arc (FIG. 2), electrodes 5 with sharpened ends are arranged at right angle to the axis of the length of the optical waveguide 1. The optical waveguide 1 is fixed by a clamp 6. An auxiliary optical waveguide 7 is secured in a three-coordinate micrometer positioner 8 with a clamp 9.

Figure 2:
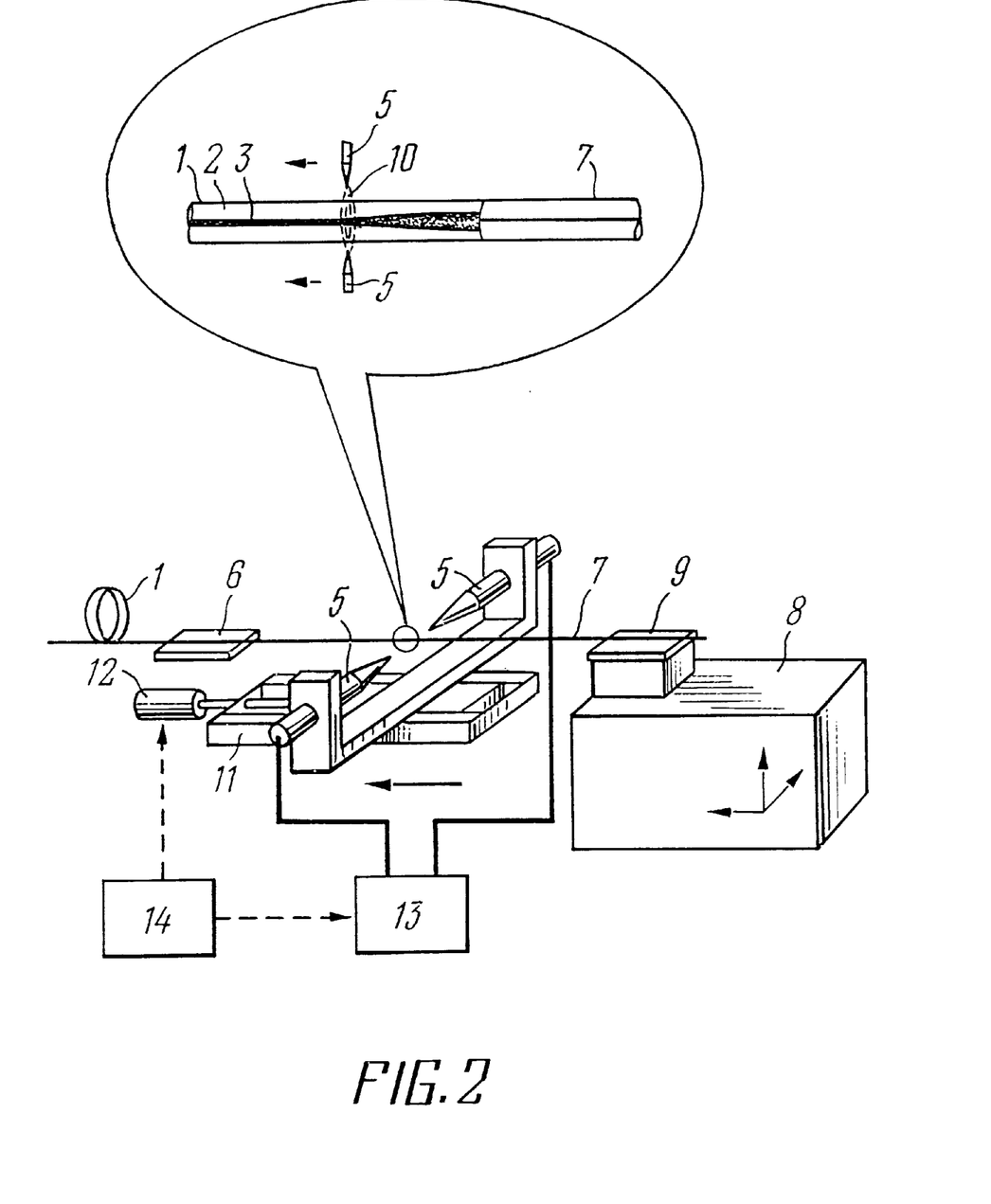
FIG. 2 is a block diagram of an apparatus for fabricating a mode field diameter conversion fiber, using an electric arc.

An electric arc 10 is displaced along the optical waveguide axis by a translator 11 with a step motor 12. The electrodes are connected to a power source 13 that sets the arc current. The electric arc displacement and current are controlled by a computer 14.

In an apparatus for fabricating a mode field diameter conversion fiber, using a CO-laser 15 (FIG. 3), a radiation beam 16 is focused at an optical waveguide 1 by a lens 17. A power regulator 18 modifies intensity of the laser radiation 16. A translator 19 with a step motor 12 displaces the optical waveguide 1 along its axis relative to the radiation beam 16. The power regulator 18 and motion of the translator 19 are controlled by a computer 14.

Figure 4:
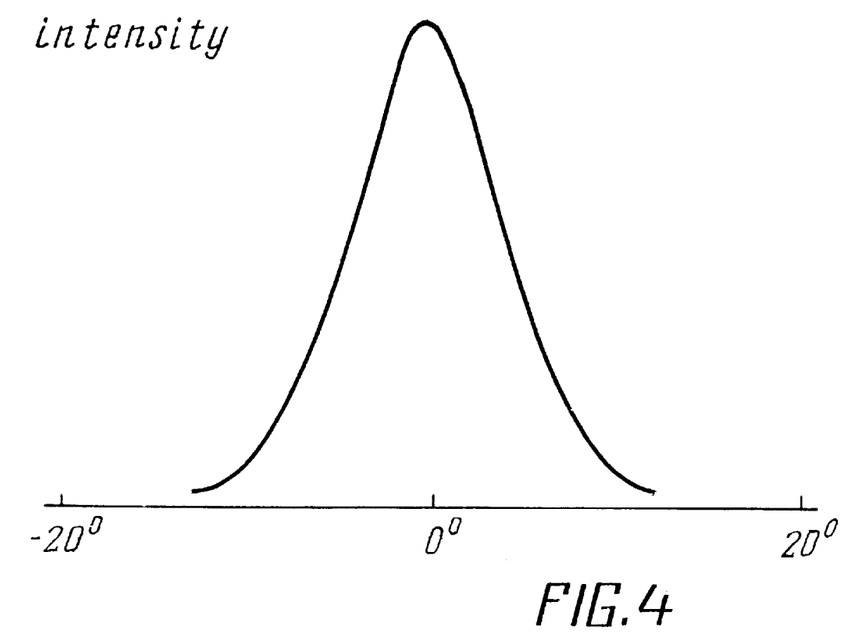
FIG. 4 is a directional diagram of the optical waveguide radiation before to thermal diffusion.
Figure 5:
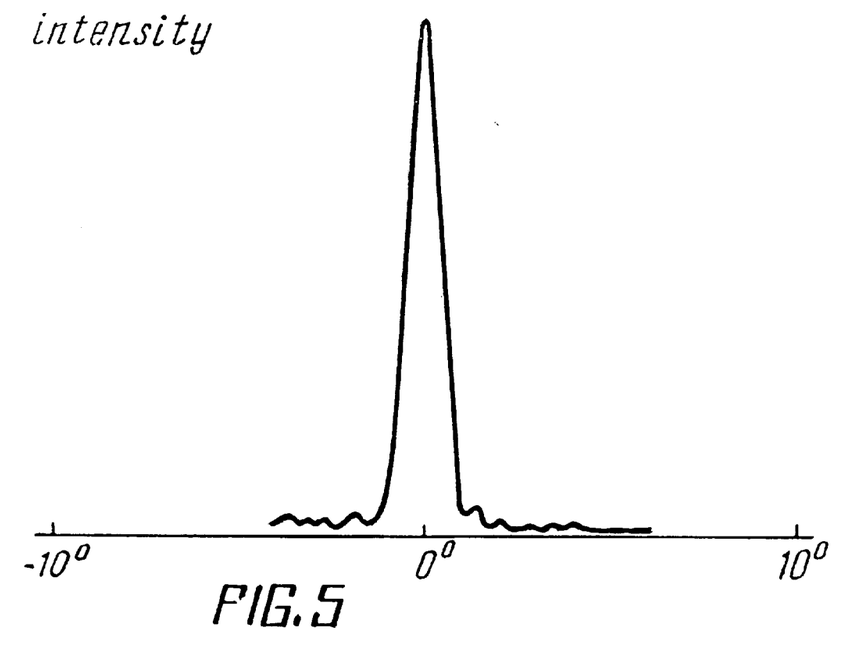
FIG. 5 is a directional diagram of the optical waveguide radiation after thermal diffusion.

To determine the mode size, a radiation pattern is measured at the output of the mode field diameter conversion fiber (FIGS. 4 and 5).

An apparatus (FIG. 2) for implementing the method according to the present invention operates as follows.

An optical waveguide 1 is spliced by an electric arc 10 with an auxiliary optical waveguide 7 that has been preliminary adjusted by a micrometer positioner 8. The arc 10 is then located at the length of the optical waveguide 1 in which thermal diffusion is conducted, or the arc is displaced along the optical waveguide.

With stationary electrodes 5, the size of the heating region is as large as 0.1 mm to 5 mm, depending on distances between the electrodes 5 and the arc 10 current. The exposure time of a local region of the optical waveguide 1 to the electric arc 10 depends on the displacement speed of the electrodes 5 along the optical waveguide 1. By adjusting the displacement speed of the arc 10, one can tailor the law of changing the core 3 diameter along the optical waveguide 1 as its end 4 approaches. Once the thermal diffusion is over, the optical waveguide 1 is cut off at right angle in the region corresponding to the required mode size, close to the area where the optical waveguide 1 is spliced with the auxiliary optical waveguide 7.

An alternative apparatus (FIG. 3) for implementing a method in accordance with the present invention operates as follows.

Figure 3:
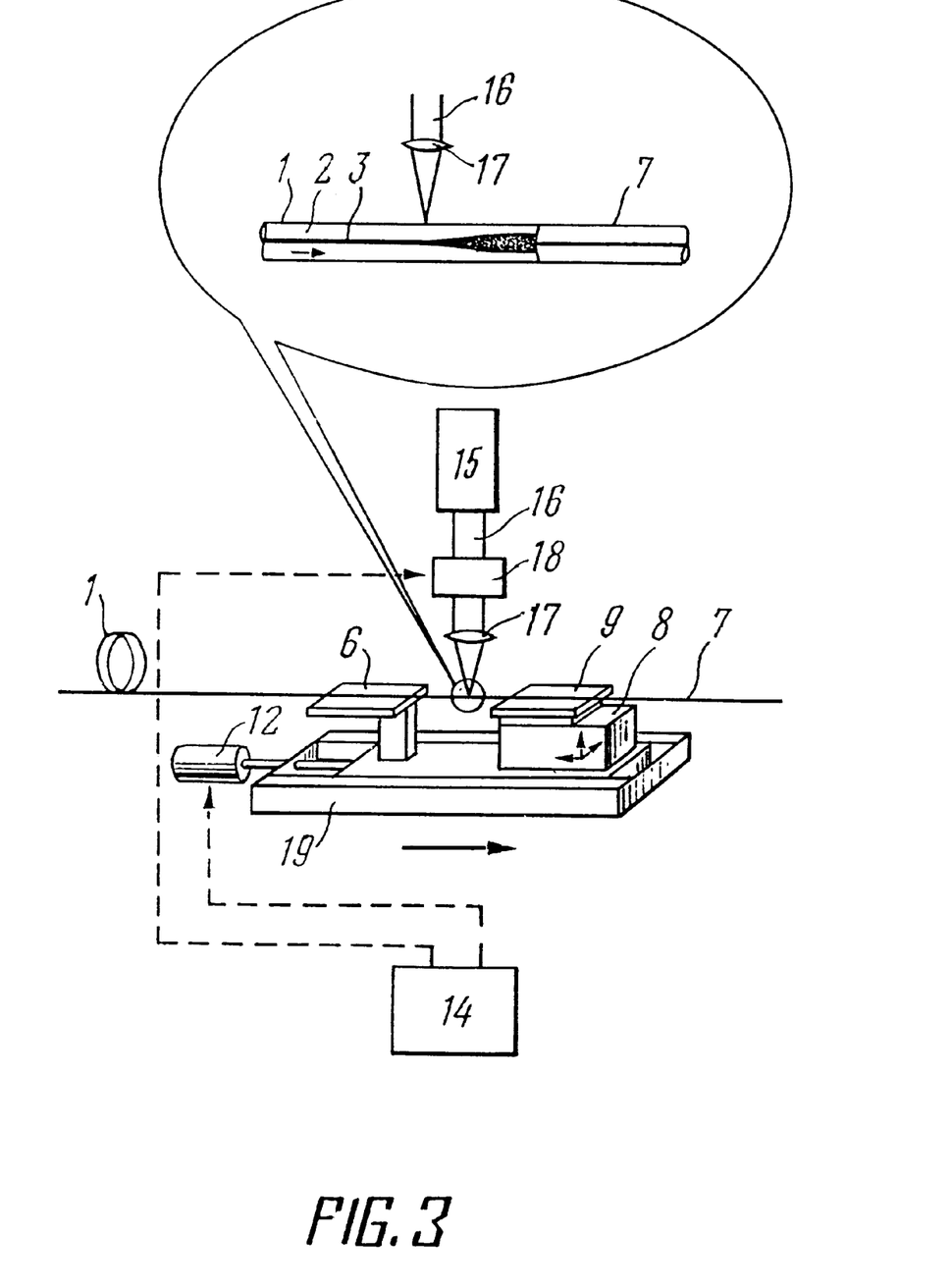
FIG. 3 is a block diagram of an apparatus for fabricating a mode field diameter conversion fiber, using a CO-laser.

An optical waveguide 1 is spliced by a laser radiation beam 16 to an auxiliary optical waveguide 7 that has been preliminarily adjusted by a micrometer positioner 8. The optical waveguide 1 and the auxiliary optical waveguide 7 are then together displaced by a translator 19 along their axis relative to the laser radiation beam 16. The exposure time of a local region of the optical waveguide 1 to a CO-laser radiation depends on the displacement speed of the optical waveguide 1 relative to the laser beam 16. By adjusting the displacement speed of the optical waveguide 1, one can tailor the law of changing the core 3 diameter along the optical waveguide 1 as its end 4 approaches. The law of changing the core 3 diameter along the axis of the optical waveguide 1 can be also set by controlling the laser radiation intensity, using a power regulator 18, at a uniform displacement of the optical waveguide 1 relative to the laser beam 16. With a stationary optical waveguide, a size of the heating region can be as large as 0.01 mm to 15 mm depending on the focal length of the lens 17 and its position. Once the thermal diffusion is over, the optical waveguide 1 is cut off at right angle to the axis, in the region corresponding to the required mode size, close to the area of splicing with the auxiliary optical waveguide 7.

To avoid a core-to-cladding mode conversion, length L of the optical waveguide, in which the mode diameter is being varied, and core diameter d should be related as L>>d. In practice, this is provided if L>1 mm. Such a smooth change in the core diameter is attained when a stationary electric arc is located within an area as large as 1 mm to 5 mm along the optical waveguide axis, both the distance between the sharpened ends of the electrodes and the current of the electric arc 10 being varied, or when the arc is displaced along the optical waveguide axis so that to heat the optical waveguide of length from 1 mm to 15 mm. The temperature, to which the length of the optical waveguide 1 can be heated, also depends on the distance between the electrodes and the arc current. Our experience suggests that depending on a dopant type, the electric arc current should be from 5 mA to 500 mA. To provide the required thermal diffusion, the exposure time of the optical waveguide 1 to the arc 10 should be from 0.1 s to 600 min, and the displacement speed of the arc along the optical waveguide axis can be varied between 1 μm/s and 1 cm/s.

Coupling of a mode field diameter conversion fiber to the other fiber elements is much easier owing to the fact that the refractive index profile of the mode field diameter conversion fiber does not include regions with a decreased refractive index, which are unavoidable when one of the dopants is fluorine. Our experience led us to conclude that the nitrogen concentration should be from 0.01 at. % to 5 at. %.

Figure 6:
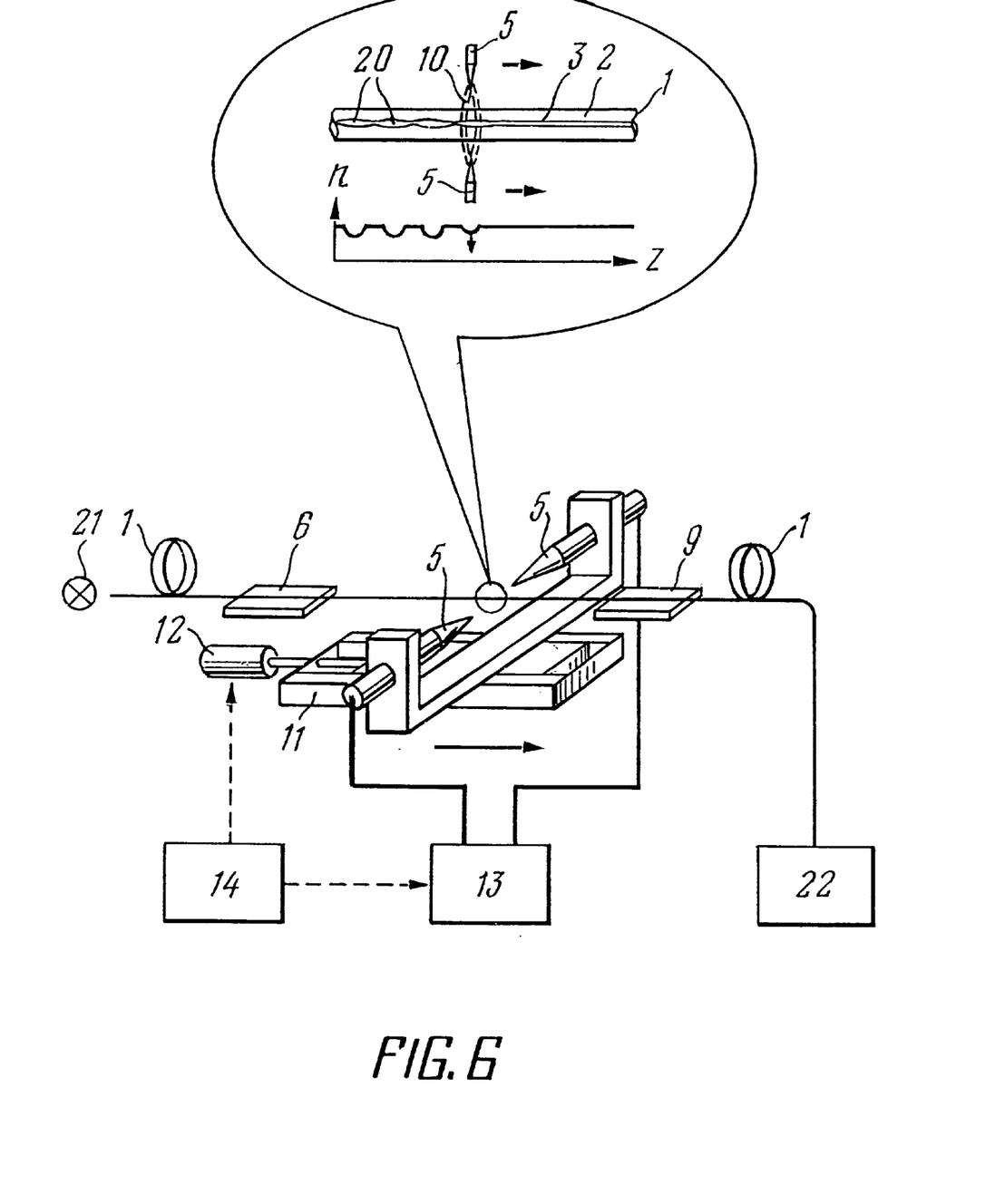
FIG. 6 is a block diagram of an apparatus for modulating the refractive index using an electric arc.

In an apparatus for a periodic modulation of the refractive index, using an electric arc (FIG. 6), electrodes 5 are arranged at right angle to the axis of the optical waveguide 1 including a cladding 2 and a core 3. The optical waveguide is fixed by clamps 6 and 9. Electrodes are connected to a power source 13 that sets an electric arc 10 current. A translator 11 with a step motor 12, adapted to displace electrodes 5 along the optical waveguide axis, forms periodic local areas 20 in which the core refractive index, due to the thermal diffusion, differs from that at the areas that were not subjected to the thermal diffusion, as shown in the plot of FIG. 6 illustrating core refractive index n as a function of coordinate z along the optical waveguide axis. To monitor the refractive index modulation, an apparatus (FIG. 6) comprises a white light source 21 and an optical spectrum analyzer 22. A computer 14 controls the step motor 12 of the translator 11 and defines a condition of the electric arc 10 by controlling the power source 13.

In an apparatus (FIG. 7) for modulating the refractive index using a laser 15, a laser radiation 16 is focused by a lens 17 at a core 3 of an optical waveguide 1. The exposure time is set by a shutter 23, and the optical waveguide displacement relative to the laser beam 16 is provided by a translator 19 with a step motor 12 under control of a computer 14.

Figure 7:
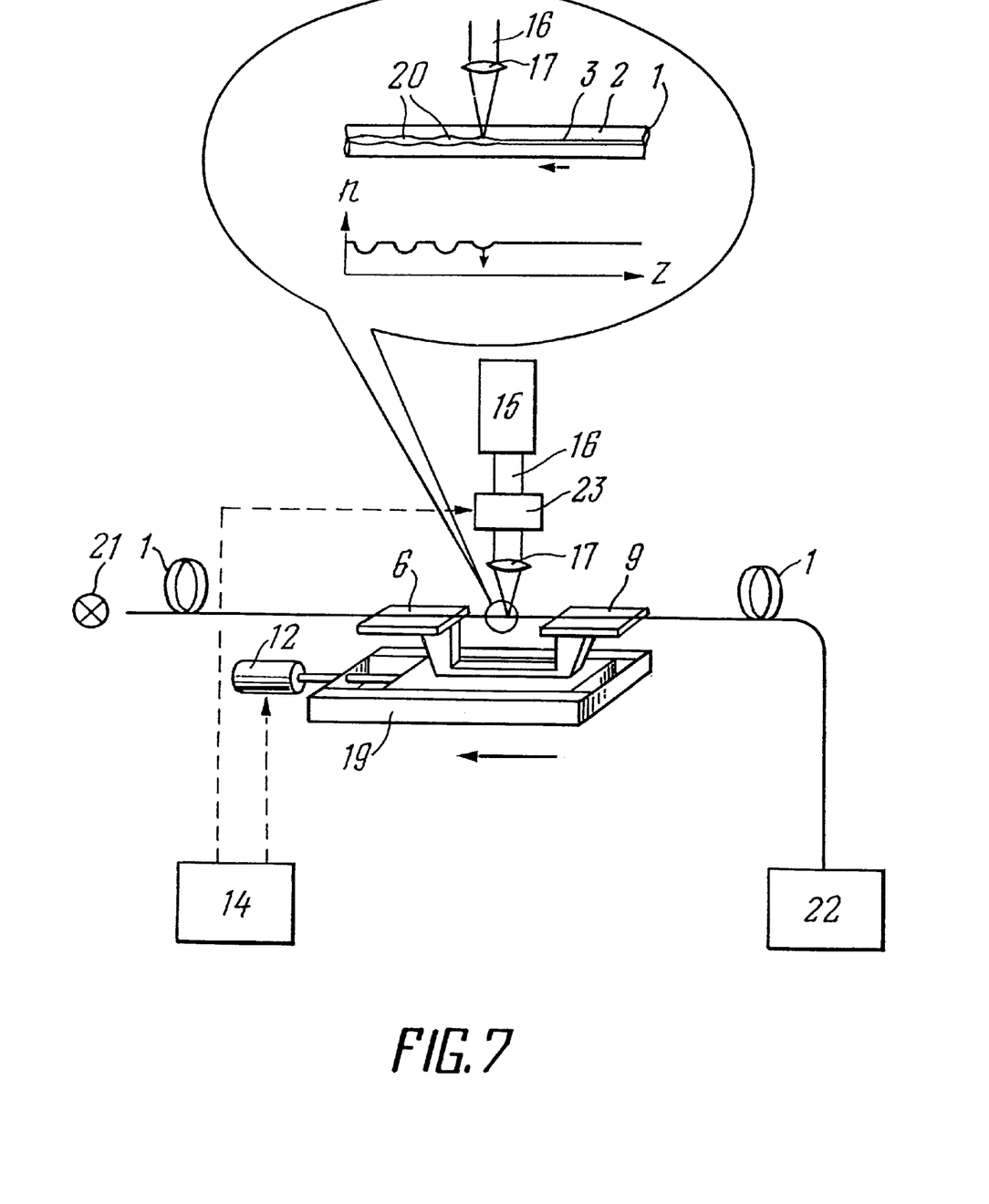
FIG. 7 is a block diagram of an apparatus for modulating the refractive index using a laser.

The basis for the present invention is a novel mechanism of modulating the refractive index of a core 3 of an optical waveguide 1. Whereas in the closest prior art the refractive index changes owing to the photorefractive effect under exposure to ultraviolet radiation, in accordance with the present invention this is attained owing to thermal diffusion of elements contained in a core 3 and/or cladding 2, when a local region of the optical waveguide 1 is heated by an electric arc discharge 10 (FIG. 6) or by a radiation 16 of an infrared laser 15 (FIG. 7). The diffusion results in a local change in the core 3 refractive index, i.e. in writing one groove of a grating. The entire grating is formed by successively writing individual grooves as the heating region is displaced along the axis of the optical waveguide 1 at a distance divisible by the period of the grating. The grating grooves can be written by successively displacing the optical waveguide 1 relative to the heating source 10 (FIG. 6) or 16 (FIG. 7) or vice versa, at one period of the grating, at two periods, by double passage across the same region of the optical waveguide 1, etc.

Temperature and time of writing the grating grooves depend on chemical compositions of the core 3 and the cladding 2 of the optical waveguide 1, and can be easily determined through conventional experiments. In quartz optical waveguides 1 with a $GeO_2$-doped core 3, the diffusion of Ge efficiently occurs at the temperatures above 1400° C. A slow diffusion results in a long writing time, and a high temperature, close to the $SiO_2$ melting point, can cause deformations in the optical waveguide 1.

To this drawback are not subjected, in particular, quartz optical waveguides 1 with a core 3 based on silicon oxynitride $Si_3N_4$:$SiO_2$, or optical waveguides 1 with a quartz core 3 and a fluorine-doped cladding 2, as diffusion coefficients of N and F to $SiO_2$ are substantially superior to that of Ge. As the result, their diffusion occurs efficiently at significantly lower temperatures, and one groove is written in a considerably less time.

An optical waveguide 1 is locally heated by an electric arc discharge 10 which is similar to that employed in apparatuses for splicing optical waveguides. A heating area length and a temperature can be varied through the selection of a distance between electrodes 5 and the arc 10 current. In particular, the distance between electrodes 5 can be in the range from D to 100 D and greater, where D is the external diameter of an optical waveguide 1, and the current can be in the range from 5 mA to 50 mA and above.

The local heating can be also implemented by a laser 15 with a radiation wavelength 16 at which a material of the optical waveguide 1 exhibits a considerable absorption of the order of 0.1 $cm^{-1}$ to 10 $cm^{-1}$. To this end, infrared lasers can be employed, such as a CO-laser with a wavelength of about 5 $\mu$m, $CO_2$-laser with a wavelength of about 10 $\mu$m, erbium laser with a wavelength of 2.76 $\mu$m, and holmium laser with a wavelength of 2.94 $\mu$m. Although the absorption in a pure quartz glass at the erbium laser radiation wavelength is less than $5 \times 10^{-2}$ $cm^{-1}$, it can be raised by several orders of magnitude owing to an OH-bond oscillation absorption line in a quartz optical waveguide (wavelength of 2.76 $\mu$m) containing water.

With the electric arc 10, the minimum heated region that can be attained is approximately equal to the external diameter of the optical waveguide 1, generally 125 $\mu$m. The exposure to infrared laser radiation can provide the minimum heated region under 10 $\mu$m.

In long-period gratings, owing to a resonant coupling between the modes of the core 3 and the cladding 2, energy is selectively coupled from the core 3 mode to the cladding 2 mode and rapidly dissipates in the external polymer coating applied onto the cladding 2. These resonant wavelengths are defined by a grating period and range, in general, from 200 $\mu$m to 400 $\mu$m. It is precisely this effect that proves the existence of modulation in the refractive index of the optical waveguide 1.

When compared to the closest prior art, the present invention provides the following advantages.

Thermal diffusion allows the refractive index to be modulated even in the optical waveguides 1 exhibiting a weak photorefractive effect.

The invention employs an arc electric discharge 10 or an infrared laser 15 as a heating source that is simple both in production and operation and, therefore, relatively cost effective.

A radiation 16 of an infrared laser 15 and of an electric arc 10 is more safe for a human than a radiation of an ultraviolet laser.

With an electric arc 10 (FIG. 6), a method according to the invention is implemented as follows.

An optical waveguide 1, from which a protective polymer coating has been stripped, is fixed in stationary clamps 6 and 9, and then electrodes 5 are set by a micrometer positioner 8 and a step motor 12 along axis z of the optical waveguide 1 in a position corresponding to a first region of changing the refractive index, whereupon a power source 13 of the electric arc 10 is turned on and the optical waveguide 1 is heated during a predetermined time, following which the power source 13 of the electric arc 10 is turned off. The electrodes 5 are next displaced by the translator 11 with a step motor 12 along the axis z of the optical waveguide 1 to a next region of changing the refractive index, spaced apart from the first region at the refractive index modulation period, following which the power source 13 of the electric arc 10 is turned on again and the optical waveguide 1 is heated during a predetermined time, whereupon the power source 13 of the arc 10 is turned off. The above operations are periodically repeated so that a number of the repetitions corresponds to the required number of the refractive index modulation periods in the core 3 of the optical waveguide 1. The step motor 12 of the translator 11 and the power source 12 of the electric arc 10 are controlled by a computer 14 to provide the desired sequence and periodicity of operations when following an appropriate routine. To monitor the process of forming a refractive index grating, a transmission spectrum of the optical waveguide 1 being heated is measured by an optical spectrum analyzer 22 and a white light source 21. Once the required depth of absorption peaks corresponding to a resonant interaction between the modes of the core 3 and the cladding 2 has been attained, the process can be terminated.

As opposed to the apparatus of FIG. 6, in an apparatus for periodic modulation of the refractive index, using an infrared laser 15 (FIG. 7), an optical waveguide 1 is fixed in clamps 6 and 9 secured on a movable part of the translator 19 which provides a displacement of the optical waveguide 1 relative to a radiation beam 16 of an infrared laser 15 performing a local heating of the optical waveguide 1. The beam is focused by a lens 17 and periodically interrupted by a shutter 15. The apparatus of FIG. 7 operates according to a routine similar to that has been described above for the apparatus of FIG. 6 and realized by the computer 14.

Figure 9:
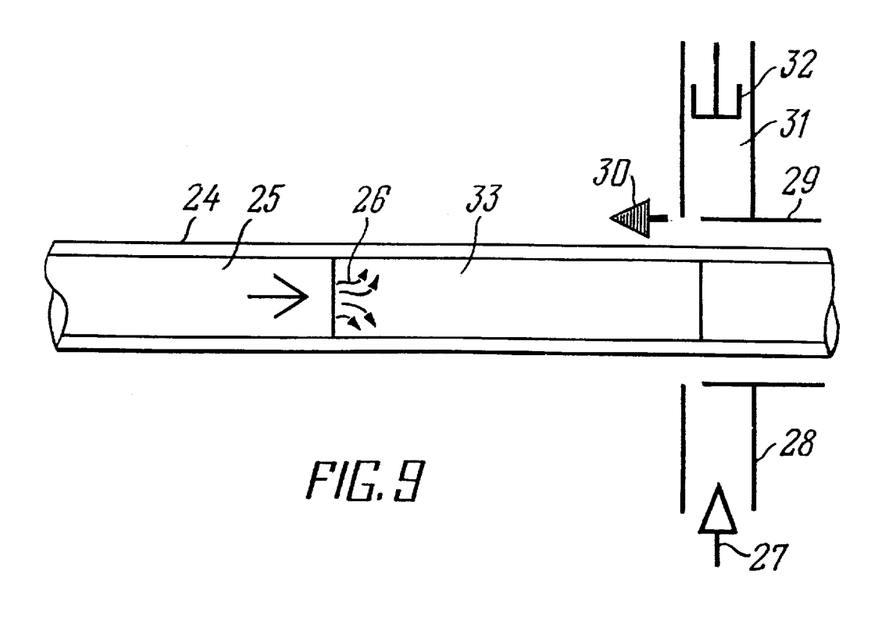
FIG. 9 is a block diagram of an apparatus implementing the method for fabricating preforms in accordance with the present invention.

To illustrate an apparatus for implementing a method for fabricating preforms for optical waveguides in accordance with the present invention, FIG. 9 depicts a substrate quartz tube 24, a mixture 25 of molecular gaseous agents, a deposition area 26, a microwave power 27 applied through a waveguide 28 to an annular gap 29, a surface plasma wave 30, a matching unit 31 with a piston 32 and a plasma column 33.

The mixture of molecular gaseous agents 25 of the composition $SiCl_4+O_2+N_2$ is supplied to a quartz glass substrate tube 24 under a pressure of several mm Hg. From the opposite side, a microwave power 27 is applied to the tube 24, which maintains a stationary discharge in the mixture, generating the plasma column 33. The agents 25 are dried oxygen and nitrogen along with silicon tetrachloride. Entering the region of the plasma column 33, the agents 25 undergo chemical transformations owing to appearance, in the mixture, of active radicals which are "generated" in the mixture from unexcited molecules when they interact with plasma "hot electrons". As the result, silicon tetrachloride transforms to silicon oxide which is adsorbed by the walls of the quartz tube 24 and is finally oxidized to silicon dioxide, owing to a heterogeneous reaction involving nitrogen-containing radicals, so that a doped quartz glass deposition area 26 is formed. By variation of a length of the plasma column 33 through altering the applied microwave power 27, the deposition area 26 can be scanned along the substrate quartz tube 24 and, in so doing, glass can be deposited layer-by-layer onto its inner surface.

The thermal diffusion coefficient of nitrogen to quartz glass is much greater than that of germanium. This facilitates fabrication of a mode field diameter conversion fiber since, unlike the closest prior art, there is no necessity to add an additional dopant with a high thermal diffusion coefficient for producing an expanding core 3 (FIG. 1) and, furthermore, the time of thermal diffusion decreases.

Once the deposition process has been finished, the substrate quartz tube 24 with a layer of nitrogen-doped glass deposited onto the inner surface is collapsed into a rod through heating in a burner flame. The so-produced preform is then drawn into a single-mode optical waveguide 1.

A quartz optical waveguide 1 with a nitrogen-doped core 3 was used to fabricate a mode field diameter conversion fiber increasing a mode diameter approximately by an order of magnitude. Nitrogen concentration in the core 3 was 1 at. %. The diameter of the core 3 of the initial optical waveguide 1 was 4.5 $\mu$m, the refractive index difference between the core 3 and the cladding 2 was $\Delta n=0.012$. The region heated by a stationary arc was as large as 0.3 mm, the electric arc current was 14 mA, the length of the heated area of the optical waveguide was 5 mm. The arc displacement speed was gradually varied from 500 $\mu$m/s to 10 $\mu$m/s as approaching the splicing point between the optical waveguide 1 and the auxiliary fiber 7. The exposure time was 1 min. During the thermal diffusion no deformations in the optical waveguide was revealed, since the optical waveguide 1 was secured only at one point by a clamp 6 and spliced at the other side with the auxiliary fiber 7 that was preliminary adjusted by a micrometer positioner 8 (FIG. 2).

A mode diameter was calculated from a pattern of radiation leaving the optical waveguide, that was illuminated from a laser diode at the opposite end face. FIG. 4 shows a radiation pattern of the optical waveguide 1 before the thermal diffusion. It can be seen that the width of the radiation pattern across one-half intensity level is 7.1° that corresponds to a fiber mode diameter of 4.9 $\mu$m. FIG. 5 illustrates radiation patterns of the optical waveguide after the thermal diffusion. It can be seen that the width of the radiation pattern across one-half intensity level has decreased to 0.80° that corresponds to a mode diameter of 43 $\mu$m.

Therefore, the use of the present inventions has allowed a mode diameter to be increased from 4.9 $\mu$m to 43 $\mu$m. In contrast to the closest prior art, the mode field diameter conversion fiber can be more easily fabricated by virtue of the fact that a number of required process steps is decreased. Owing to the auxiliary optical waveguide 7 spliced with the optical waveguide 1 subjected to the thermal diffusion, the optical waveguide deformations, occurring in the closest prior art owing to relaxation of stresses, are entirely avoided in the thermal diffusion. Unlike the closest prior art, the refractive index profile of a mode field diameter conversion fiber produced in accordance with present invention does not contain regions with a decreased refractive index, which makes it completely compatible with the conventional ones.

Long-period gratings were also written in a quartz optical waveguide 1 with a core 3 of $Si_3N_4:SiO_2$, diameter 4.5 $\mu$m, and a cladding 2 of $SiO_2$, diameter 120 $\mu$m, wherein the refractive index difference between the core and the cladding was $\Delta n=0.012$, and the nitrogen concentration was 1 at. %.

In a first embodiment, a heating source was an electric arc discharge 10 (FIG. 6). The arc 10 was axially displaced along the optical waveguide 1 by a translator 6 at a distance of 250 $\mu$m controlled with an accuracy of 10 $\mu$m. A distance between electrodes 5 and current of the arc 10 were 150 $\mu$m and 5 mA, respectively, so that the size of the region 20, in which the refractive index changed, was about the same as the diameter of the optical waveguide 1. A microscope was used to monitor this size by a characteristic dimension of the core 3 light emission region measuring about 120 $\mu$m. The time it took for every groove to be written was 1 s. The grating period was 250 $\mu$m, the total number of grooves was 80.

Figure 8:
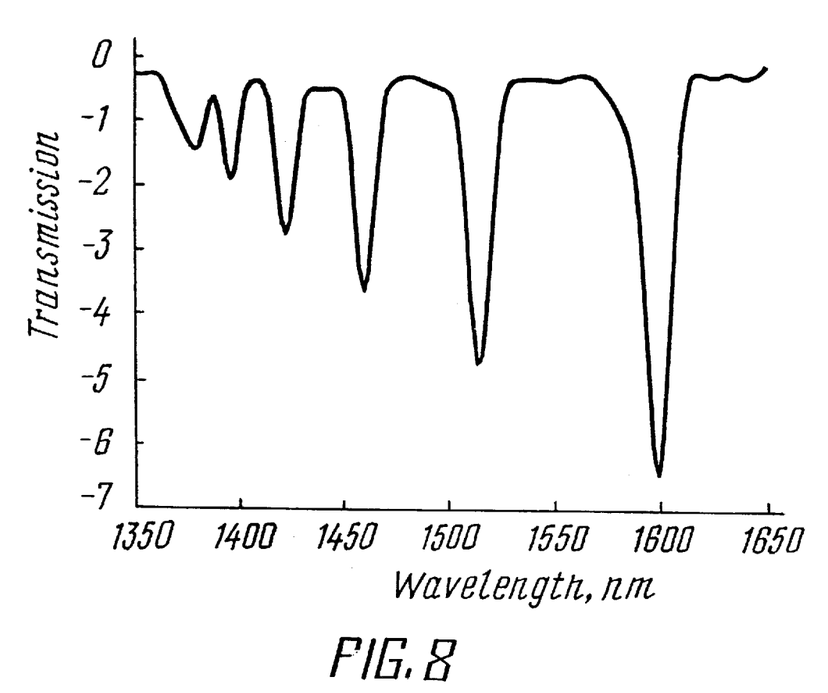
FIG. 8 illustrates a characteristic transmission spectrum of a long-period grating 20 mm in length, produced using thermal diffusion.

Transmission spectrum (FIG. 8) was monitored by an optical spectrum analyzer 22. The spectrum shows seven absorption peaks corresponding to resonant coupling of the core 3 mode to the cladding 2 axially symmetric modes having dissimilar lateral indices. This is unambiguously indicative of a periodic modulation in the refractive index of the core 3 of the optical waveguide 1 and a generation of a long-period grating of the refractive index of the core 3.

To produce a preform for an optical waveguide 1 with an undoped quartz glass cladding 2, a nitrogen-doped glass core 3, and Δn=0.02, a substrate quartz tube 24, having a diameter of 20 mm and a wall thickness of 2 mm, is heated to the temperature of 1300° C. A mixture 25 of composition $SiCl_4+O_2+N_2$ is supplied to the substrate tube 24 under a total pressure of 1 mm Hg. Microwave power 27 is varied in the range between 1 kW and 5 kW. The required level of doping the glass with nitrogen is obtained at mass flow ratios $[SiCl_4]:[O_2]=0.92$ and $[O_2]:[N_2]=0.5$. The amounts of oxygen and silicon atoms incoming to the reactor in a unit time are in the ratio of 2.2, while the nitrogen-to-oxygen atoms ratio is 2.

To produce a preform for an optical waveguide 1 with an undoped quartz glass cladding 2, a nitrogen-doped glass core 3 and Δn=0.01, a substrate tube 24 having a diameter of 20 mm and a wall thickness of 2 mm is heated to the temperature of 1300° C. A mixture 25 of composition $SiCl_4+O_2+N_2$ is supplied to the substrate tube 24 under a total pressure of 1 mm Hg. Microwave power 27 is varied in the range between 1 and 5 kW. The required level of doping of the glass with nitrogen is obtained at mass flow ratios $[SiCl_4]:[O_2]=0.92$ and $[O_2]:[N_2]=0.5$. The amounts of oxygen and silicon atoms incoming to the reactor at a unit time are in the ratio of 2.6, while the nitrogen-to-oxygen atoms ratio is 2.

6. INDUSTRIAL APPLICABILITY

The present invention relates to fiber optics and can be employed in fiber radiation collimators, optical waveguide couplers, spectral filters, optical isolators, long-period gratings, dispersion compensators, cascade mode field diameter conversion fibers on simulated Raman effect, sensors of physical values (refractive index, temperatures, stresses, etc.), radiation suppression units for predetermined wavelengths, e.g. for enhanced spontaneous luminescence peak at a wavelength of 1.53 μm in erbium fiber amplifiers, spontaneous luminescence over the region of 1.06 μm in neodymium amplifiers and lasers operating in other spectral ranges, and for smoothing the gain spectrum in erbium fiber amplifiers employed, in particular, in systems with wavelength division multiplexing.

What is claimed is:

1. A mode field diameter conversion fiber comprising a length of an optical waveguide including a quartz glass cladding and a doped quartz glass core, a diameter of the core varying along the length of the optical waveguide to increase towards an end the core of the optical waveguide being doped with a dopant, nitrogen as a, the dopant concentration being from 0.01 at. %. to 5 at. %.

2. A method for locally changing the refractive index of an optical waveguide, including the steps of:
   heating a length of the optical waveguide comprising a cladding and a core, each being based on quartz glass and at least one being doped with nitrogen,
   providing a local thermal diffusion of elements contained in the core to the cladding, and providing a local thermal diffusion of elements contained in the cladding to the core,
   said local thermal diffusion being conducted by heating the length of the optical waveguide having the core doped with nitrogen in a concentration from 0.01 at. % to 5 at. %, the heating being provided by a current of an electric arc or by radiation of an infrared laser.

3. A method of claim 2, wherein the heating of the length of the optical waveguide is periodically interrupted, and during said periodic interruption a heating area is relatively displaced along the optical waveguide axis at a distance divisible by a spatial interval of refractive index variation.

4. A method of claim 2, wherein said local thermal diffusion is a local thermal diffusion of further dopants selected from the group consisting of phosphorous, aluminum, sodium, potassium, lithium, cesium, fluorine, boron and at least one rare-earth element.

5. A method of claim 2, wherein the length of the optical waveguide is heated by the current of the electric arc from 5 mA to 500 mA for a time from 0.1 s to 600 min, the electric arc being located within a region as large as 1 mm to 15 mm along the axis of the optical waveguide and generated by electrodes with sharpened ends, and the heating is followed by cutting off the length of the optical waveguide at a right angle to its axis in a region corresponding to a predetermined mode size.

6. A method of claim 2, wherein the electric arc is displaced along the axis of the optical waveguide at a variable speed and the current of the electric arc is varied.

7. A method of claim 2, wherein the heating is performed using radiation of a CO-laser, a $CO_2$-laser, an erbium laser or a holmium laser.

8. A method of claim 2, wherein the length of the optical waveguide which is heated has a silicon oxynitride ($Si_3N_4:SiO_2$)-based core.

9. A method of claim 2, wherein the length of the optical waveguide which is heated has a fluorine and boron-doped cladding.

* * * * *